No. 861,225. PATENTED JULY 23, 1907.
E. F. PRICE.
PROCESS OF PRODUCING SILICOSPIEGEL.
APPLICATION FILED NOV. 14, 1905.
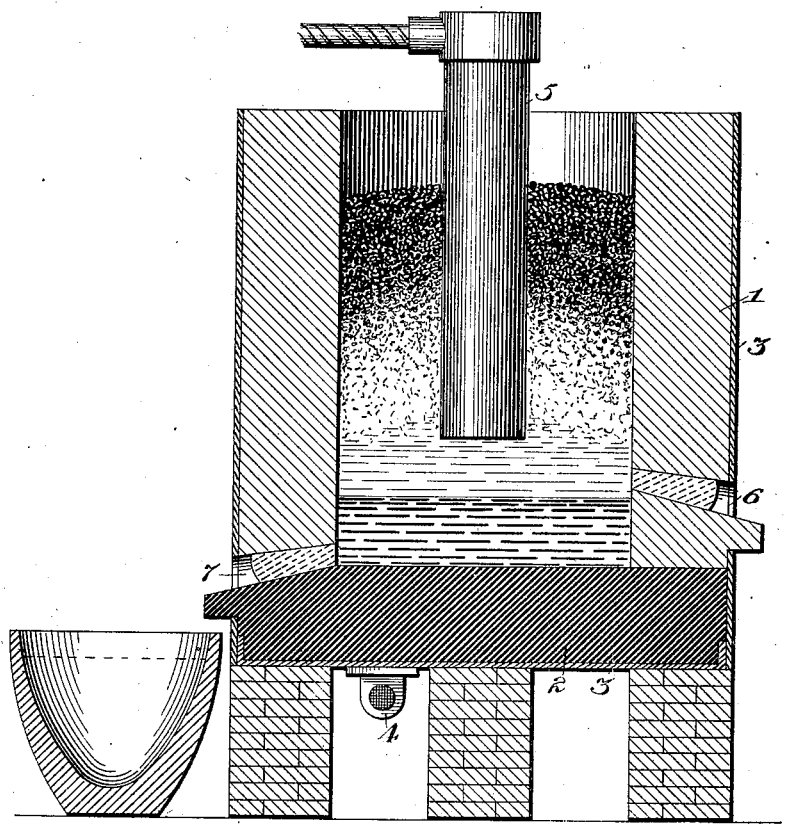
Witnesses:
Inventor:
Edgar F. Price,
by Byrnes Townsend
Att'ys.

UNITED STATES PATENT OFFICE.

EDGAR F. PRICE, OF NIAGARA FALLS, NEW YORK.

PROCESS OF PRODUCING SILICOSPIEGEL.

No. 861,225.                Specification of Letters Patent.        Patented July 23, 1907.

Application filed November 14, 1905. Serial No. 287,351.

*To all whom it may concern:*

Be it known that I, EDGAR F. PRICE, a citizen of the United States, residing at Niagara Falls, in the county of Niagara and State of New York, have invented certain new and useful Improvements in Processes of Producing Silicospiegel, of which the following is a specification.

According to this process, a charge containing compounds of manganese and silicon, and iron or iron ore is smelted in an electric-arc furnace, carbon being added to the charge in amount sufficient to not only effect reduction of the manganese and silicon but also to protect the carbon electrodes from oxidation. A considerable body of the charge is maintained around the depending electrode or electrodes, and the reduction, withdrawal of the product and supply of the charge-mixture are conducted as a continuous operation. The potential difference between the electrode terminals is preferably kept at the minimum value requisite for the maintenance of an arc, to prevent leakage of current through the charge.

A suitable arc furnace is shown in the accompanying drawing, in which the figure is an axial section through the tap-holes.

The furnace comprises sides 1 of refractory material, such as carborundum, siloxicon, silica or carbon, and a hearth 2 of carbon, surrounded by a metal casing 3 having an electric terminal 4. The carbon hearth constitutes one electrode and the other electrode is a depending carbon rod 5. Tap-holes 6, 7 for slag and metal extend through the side walls at different heights.

In employing this furnace to carry out the process, an arc is established between the depending electrode and the carbon hearth and a small amount of the charge, for example a mixture of pyrolusite, silica, iron ore and carbon, the carbon being in excess, is fed in. The furnace is then gradually filled until in its normal working condition the depending electrode is embedded in the charge, as illustrated. As the manganese, silicon and iron are reduced, a layer of molten alloy collects in the bottom of the furnace and may be removed from time to time through the tap-hole 6. If the charge contains impurities, any resulting slag is removed through the tap-hole 5. It will be seen that the deep body of the charge surrounding the depending electrode effectively protects it from oxidation and retains the heat within the furnace, both increasing the production of the metal and maintaining the product in a molten condition without especial attention. The use of this deep body is made possible by, and makes it important to employ, the minimum potential difference between the electrode terminals, to prevent excessive waste of current by shunting through the charge. The furnace is operated continuously, the product being drawn off and the charge-mixture added as required.

The process may be obviously carried out in a furnace having two depending electrodes of opposite polarity, the arc being sprung between the lower ends of the electrodes or between each electrode and the carbon hearth.

I claim:—

1. The process of producing silico-spiegel by smelting a charge of compounds of manganese and silicon, carbon and a source of iron, which consists in establishing an electric arc within the charge, surrounding the zone of reduction and protecting the electrode or electrodes by a considerable body of the charge, and withdrawing the product and supplying the charge-mixture as required, as set forth.

2. The process of producing silico-spiegel by smelting a charge of compounds of manganese and silicon, carbon and a source of iron, which consists in establishing an electric arc within the charge, surrounding the zone of reduction and protecting the electrode or electrodes by a considerable body of the charge, and maintaining between the electrode-terminals the minimum potential difference requisite to effect reduction, thereby preventing excessive loss of current by leakage through the charge, as set forth.

3. The process of producing silico-spiegel by smelting a charge of compounds of manganese and silicon, carbon and a source of iron, which consists in establishing an electric arc within the charge, surrounding the zone of reduction and protecting the electrode or electrodes by a considerable body of the charge, maintaining between the electrode-terminals the minimum potential difference requisite to effect reduction, thereby preventing excessive loss of current by leakage through the charge, and withdrawing the product and supplying the charge-mixture as required, as set forth.

In testimony whereof, I affix my signature in presence of two witnesses.

EDGAR F. PRICE.

Witnesses:
G. E. COX,
D. BURGESS.